(12) United States Patent
Mizrahi et al.

(10) Patent No.: US 10,180,841 B2
(45) Date of Patent: Jan. 15, 2019

(54) EARLY TERMINATION OF SEGMENT MONITORING IN RUN-TIME CODE PARALLELIZATION

(71) Applicant: Centipede Semi Ltd., Netanya (IL)

(72) Inventors: Noam Mizrahi, Hod Hasharon (IL); Alberto Mandler, Zichron Yaakov (IL); Shay Koren, Tel-Aviv (IL); Jonathan Friedmann, Even Yehuda (IL)

(73) Assignee: Centipede Semi Ltd., Netanya (IL)

( * ) Notice: Subject to any disclaimer, the term of this patent is extended or adjusted under 35 U.S.C. 154(b) by 168 days.

(21) Appl. No.: 15/007,299

(22) Filed: Jan. 27, 2016

(65) Prior Publication Data

US 2016/0179536 A1    Jun. 23, 2016

Related U.S. Application Data

(63) Continuation-in-part of application No. 14/578,518, filed on Dec. 22, 2014.

(51) Int. Cl.
  *G06F 9/38*  (2018.01)
  *G06F 9/46*  (2006.01)
  (Continued)

(52) U.S. Cl.
  CPC .......... *G06F 9/3808* (2013.01); *G06F 9/3838* (2013.01); *G06F 9/3851* (2013.01);
  (Continued)

(58) Field of Classification Search
  CPC ..................... G06F 9/30065; G06F 9/3851
  See application file for complete search history.

(56) References Cited

U.S. PATENT DOCUMENTS

| 4,991,080 A | 2/1991 | Emma et al. |
| 5,394,529 A | 2/1995 | Brown, III et al. |

(Continued)

FOREIGN PATENT DOCUMENTS

| CN | 101847094 A | 9/2010 |
| EP | 1622004 A2 | 2/2006 |

(Continued)

OTHER PUBLICATIONS

Marcuello et al., "Speculative Multithreaded Processors," 1998, Proc. 12th Int'l Conf. on Supercomputing, pp. 77-84.*

(Continued)

*Primary Examiner* — Yuqing Xiao
(74) *Attorney, Agent, or Firm* — D. Kligler IP Services Ltd.

(57) ABSTRACT

A processor includes a processing pipeline including multiple hardware threads and configured to execute software code instructions that are stored in a memory, along with multiple registers, configured to be read and written to by the processing pipeline during execution of the instructions. A monitoring unit monitors the instructions in the processing pipeline and records respective monitoring tables indicating the registers accessed in processing the instructions in different sequences of the instructions, and parallelizes among the hardware threads of the processor, using the respective monitoring tables, execution of repetitions of at least first sequences of the instructions. The monitoring unit is configured to evaluate a termination criterion based on the monitored instructions while monitoring the processing and recording the respective monitoring tables, and upon meeting the termination criterion, to terminate the monitoring before completion of the recording of the respective monitoring tables for at least second sequences of the instructions.

20 Claims, 5 Drawing Sheets

(51) Int. Cl.
*G06F 11/30* (2006.01)
*G06F 11/34* (2006.01)

(52) U.S. Cl.
CPC ............ *G06F 9/46* (2013.01); *G06F 11/30* (2013.01); *G06F 11/3466* (2013.01); *G06F 11/348* (2013.01); *G06F 2201/865* (2013.01); *G06F 2201/88* (2013.01)

(56) References Cited

U.S. PATENT DOCUMENTS

| | | | |
|---|---|---|---|
| 5,781,752 | A | 7/1998 | Moshovos et al. |
| 5,931,957 | A | 8/1999 | Konigsburg et al. |
| 6,101,595 | A | 8/2000 | Pickett et al. |
| 6,247,121 | B1 | 6/2001 | Akkary et al. |
| 6,463,523 | B1 | 10/2002 | Kessler et al. |
| 7,134,005 | B2 | 11/2006 | Henry et al. |
| 7,194,603 | B2 | 3/2007 | Burky et al. |
| 7,434,032 | B1 | 10/2008 | Coon et al. |
| 7,571,302 | B1 | 8/2009 | Chen et al. |
| 7,600,221 | B1 | 10/2009 | Rangachari |
| 8,392,651 | B2 | 3/2013 | Mylavarapu et al. |
| 9,170,792 | B2 | 10/2015 | Park et al. |
| 9,208,066 | B1 * | 12/2015 | Mizrahi .................. G06F 8/452 |
| 9,348,595 | B1 * | 5/2016 | Mizrahi ................ G06F 9/3838 |
| 9,715,390 | B2 * | 7/2017 | Mizrahi ................ G06F 9/3861 |
| 2002/0194457 | A1 | 12/2002 | Akkary |
| 2003/0135711 | A1 | 7/2003 | Shoemaker et al. |
| 2004/0073781 | A1 | 4/2004 | Hokenek et al. |
| 2005/0132376 | A1 | 6/2005 | Rodgers et al. |
| 2005/0172277 | A1 | 8/2005 | Chheda et al. |
| 2005/0198481 | A1 | 9/2005 | Henry et al. |
| 2005/0240930 | A1 | 10/2005 | Amamiya et al. |
| 2006/0026411 | A1 | 2/2006 | Yoshida |
| 2006/0174237 | A1 | 8/2006 | Granston et al. |
| 2009/0063823 | A1 | 3/2009 | Burky et al. |
| 2009/0077545 | A1 | 3/2009 | Silvera et al. |
| 2009/0138690 | A1 | 5/2009 | Luick |
| 2009/0172362 | A1 | 7/2009 | Shen et al. |
| 2009/0235237 | A1 | 9/2009 | Song et al. |
| 2010/0299657 | A1 | 11/2010 | Barua et al. |
| 2011/0055484 | A1 | 3/2011 | Eichenberger et al. |
| 2011/0067014 | A1 | 3/2011 | Song et al. |
| 2011/0265067 | A1 | 10/2011 | Schulte et al. |
| 2012/0023316 | A1 | 1/2012 | Flachs et al. |
| 2012/0151463 | A1 | 6/2012 | Kalogeropulos et al. |
| 2013/0091340 | A1 | 4/2013 | Abdallah |
| 2013/0166886 | A1 | 6/2013 | Sasanka et al. |
| 2014/0215187 | A1 | 7/2014 | Yazdani |
| 2014/0244976 | A1 | 8/2014 | Sundar et al. |
| 2014/0317380 | A1 | 10/2014 | Yamamoto et al. |
| 2015/0220341 | A1 | 8/2015 | Onannessian |
| 2016/0011869 | A1 | 1/2016 | Jackson |
| 2016/0179549 | A1 | 6/2016 | Xekalakis et al. |
| 2016/0357529 | A1 | 12/2016 | Tsujimori |
| 2017/0010894 | A1 | 1/2017 | Nalluri et al. |
| 2017/0277544 | A1 * | 9/2017 | Mizrahi ................ G06F 9/3861 |

FOREIGN PATENT DOCUMENTS

| | | | |
|---|---|---|---|
| EP | 2778907 | A2 | 9/2014 |
| GB | 2448118 | A | 10/2008 |

OTHER PUBLICATIONS

Daniel Ortiz-Arroyo and Ben Lee, "Dynamic Simultaneous Multithreaded Architecture," Aug. 2003, Proc. 16th Int'l Conf. Parallel and Distributed Computing Systems, 8 pages.*
U.S. Appl. No. 14/690,424 Office Action dated Dec. 9, 2015.
U.S. Appl. No. 14/673,889 Office Action dated Mar. 1, 2017.
U.S. Appl. No. 14/673,884 Office Action dated Mar. 16, 2017.
U.S. Appl. No. 14/673,884 Office Action dated Jun. 16, 2017.
U.S. Appl. No. 14/673,889 Office Action dated Jun. 16, 2017.
International Application # PCT/IB2015/059468 Search Report dated Apr. 7, 2016.
International Application # PCT/IB2015/059469 Search Report dated Mar. 31, 2016.
International Application # PCT/IB2015/059467 Search Report dated Apr. 12, 2016.
International Application # PCT/IB2015/059470 Search Report dated Mar. 29, 2016.
International Application # PCT/IB2016/050562 Search Report dated May 11, 2016.
International Application # PCT/IB2017/056057 search report dated Jan. 9, 2018.
European Application # 17188441.4 search report dated Mar. 7, 2018.
U.S. Appl. No. 14/673,889 office action dated Oct. 30, 2017.
U.S. Appl. No. 14/673,884 office action dated Oct. 18, 2017.
International Application # PCT/I132017/057122 search report dated Mar. 8, 2018.
U.S. Appl. No. 14/673,884 office action dated May 16, 2018.
Rundberg et al., "An All-Software Thread-Level Data Dependence Speculation System for Multiprocessors", Journal of Instruction Level Parallelism 3, No. 1, 28 pages, Jan. 16, 2002.
U.S. Appl. No. 14/673,889 office action dated May 3, 2018.
European Application # 15872056.5 search report dated Aug. 27, 2018.
European Application # 15883861.5 search report dated Oct. 10, 2018.
Nelson., "Dependency speculation in dynamic simultaneous multi-threading", Oregon state University, 40 pages, Dec. 2, 2005.
Srinivasan et al., "A Minimal Dual-Core Speculative Multi-Threading Architecture", IEEE International Conference on Computer Design: VLSI in Computers and Processors, pp. 360-367, Oct. 11, 2004.

* cited by examiner

| Code in instructions | Dependencies between instructions |
|---|---|
| 1 mov r9, r2 | 1,2,3 depend on 3 from previous iteration |
| 2 ldrb r0, [r2] | 4 depends on 2 |
| 3 strb ip, [r2], #1 | 6 depends on 2 |
| 4 cmp r5, r0 | 3 depends on 6 from previous iteration |
| 5 beq outside_loop | |
| 6 mov ip, r0 | |
| 7 b 1 | |

| Cycles | TH1 | TH2 | TH3 | TH4 |
|---|---|---|---|---|
| 0 | 11,12,13 | | | |
| 1 | | 21,22 | | |
| 2 | | | | |
| 3 | | | | |
| 4 | 14,16 | | | |
| 5 | | 23,24,26 | | |
| 6 | | | 31,32,33 | |
| 7 | | | | 41,42 |
| 8 | | | | |
| 9 | | | | |
| 10 | | | 34,36 | |
| 11 | | | | 43,44,46 |

Two iterations in 6 cycles (average of 3 cycles/iteration)

EARLY TERMINATION OF SEGMENT MONITORING IN RUN-TIME CODE PARALLELIZATION

CROSS-REFERENCE TO RELATED APPLICATIONS

This application is a continuation-in-part of U.S. patent application Ser. No. 14/578,518, filed Dec. 22, 2014, whose disclosure is incorporated herein by reference.

FIELD OF THE INVENTION

The present invention relates generally to processor design, and particularly to methods and systems for run-time code parallelization.

BACKGROUND OF THE INVENTION

Various techniques have been proposed for dynamically parallelizing software code at run-time. For example, Akkary and Driscoll describe a processor architecture that enables dynamic multithreading execution of a single program, in "A Dynamic Multithreading Processor," Proceedings of the $31^{st}$ Annual International Symposium on Microarchitectures, December, 1998, which is incorporated herein by reference.

Marcuello et al., describe a processor microarchitecture that simultaneously executes multiple threads of control obtained from a single program by means of control speculation techniques that do not require compiler or user support, in "Speculative Multithreaded Processors," Proceedings of the $12^{th}$ International Conference on Supercomputing, 1998, which is incorporated herein by reference.

Marcuello and Gonzales present a microarchitecture that spawns speculative threads from a single-thread application at run-time, in "Clustered Speculative Multithreaded Processors," Proceedings of the $13^{th}$ International Conference on Supercomputing, 1999, which is incorporated herein by reference.

In "A Quantitative Assessment of Thread-Level Speculation Techniques," Proceedings of the $14^{th}$ International Parallel and Distributed Processing Symposium, 2000, which is incorporated herein by reference, Marcuello and Gonzales analyze the benefits of different thread speculation techniques and the impact of value prediction, branch prediction, thread initialization overhead and connectivity among thread units.

Ortiz-Arroyo and Lee describe a multithreading architecture called Dynamic Simultaneous Multithreading (DSMT) that executes multiple threads from a single program on a simultaneous multithreading processor core, in "Dynamic Simultaneous Multithreaded Architecture," Proceedings of the $16^{th}$ International Conference on Parallel and Distributed Computing Systems (PDCS'03), 2003, which is incorporated herein by reference.

SUMMARY OF THE INVENTION

An embodiment of the present invention that is described herein provides a processor, which includes a processing pipeline including multiple hardware threads and configured to execute software code instructions that are stored in a memory, and multiple registers, configured to be read and written to by the processing pipeline during execution of the instructions. A monitoring unit is configured to monitor the instructions in the processing pipeline and to record respective monitoring tables indicating the registers accessed in processing the instructions in different sequences of the instructions, and to parallelize among the hardware threads of the processor, using the respective monitoring tables, execution of repetitions of at least first sequences of the instructions. The monitoring unit is configured to evaluate a termination criterion based on the monitored instructions while monitoring the processing and recording the respective monitoring tables, and upon meeting the termination criterion, to terminate the monitoring before completion of the recording of the respective monitoring tables for at least second sequences of the instructions.

In one embodiment, the termination criterion is met when, in a sequence of the instructions being monitored, a number of registers that were written to, a count of instructions or micro-ops, a count of execution cycles, or a number of branch instructions exceeds a predefined threshold. Additionally or alternatively, the termination criterion is met when, in a sequence of the instructions being monitored, the monitoring reaches a location in the program code that was monitored previously. Further additionally or alternatively, the termination criterion is met when, in a sequence of the instructions being monitored, the monitoring reaches a location in the program code that is identified as repetitive. Still further additionally or alternatively, the termination criterion is met when, in a sequence of the instructions being monitored, a branch mis-prediction occurs during or preceding the monitoring.

In a disclosed embodiment, each of the monitoring tables is uniquely associated with a respective flow-control trace traversed by the monitored instructions. Alternatively, at least some of the monitoring tables are associated with two or more flow-control traces traversed by the monitored instructions.

In a disclosed embodiment, the monitoring unit is configured to monitor the instructions immediately following decoding of the instructions in the processing pipeline of the processor. Alternatively, the monitoring unit is configured to monitor the instructions before execution of the instructions in the processing pipeline of the processor, including monitoring speculative instructions that will be subsequently flushed. Typically, the monitoring unit is configured to retain respective names of the registers throughout the monitoring.

In the disclosed embodiments, each of the monitoring tables includes, for each register written to by the processing pipeline in executing the instructions in a respective sequence, a record of the last instruction in the sequence at which the processing pipeline wrote to the register. Typically, the processing pipeline is configured to decide, during the parallelized execution of each of the repetitions, when to issue the instructions with regard to a given register in subsequent repetitions based on the record of the last instruction at which the processing pipeline wrote to the given register. In one embodiment, the record of the last instruction includes a count of a number of times that each register was written to by the processing pipeline in executing the instructions in the sequence, and the monitoring unit is configured to determine, in each of the repetitions, that the last instruction has been written to the given register by counting writes in each of the repetitions up to the count in the record.

In a disclosed embodiment, the monitoring unit is configured to classify at least some of the registers in the monitoring tables as one of a local register whose first occurrence in a given monitored sequence is as a destination; a global register that is used in the given monitored sequence only as an operand; and a global-local register whose first occurrence in the given monitored sequence is as an operand, and is subsequently used in the given monitored sequence as a destination.

There is also provided, in accordance with an embodiment of the invention, a method for operating a processing pipeline that includes multiple hardware threads and is configured to execute software code instructions that are stored in a memory while reading and writing to multiple registers during execution of the instructions, the method including. Execution of the instructions by the processing pipeline is monitored, and while the processing pipeline executes sequences of the instructions, respective monitoring tables are recorded, indicating the registers accessed by the processing pipeline in executing the instructions in the sequences. Execution of repetitions of at least first sequences of the instructions is parallelized among the hardware threads of the processor, using the respective monitoring tables. While monitoring the execution and recording the respective monitoring table, a termination criterion is evaluated based on the monitored instructions. Upon meeting the termination criterion, the monitoring is terminated before completion of the recording of the respective monitoring tables for at least second sequences of the instructions.

The present invention will be more fully understood from the following detailed description of the embodiments thereof, taken together with the drawings in which:

BRIEF DESCRIPTION OF THE DRAWINGS

FIG. 1 is a block diagram that schematically illustrates a processor that performs run-time code parallelization, in accordance with an embodiment of the present invention;

DETAILED DESCRIPTION OF EMBODIMENTS

Overview

Figure 2:
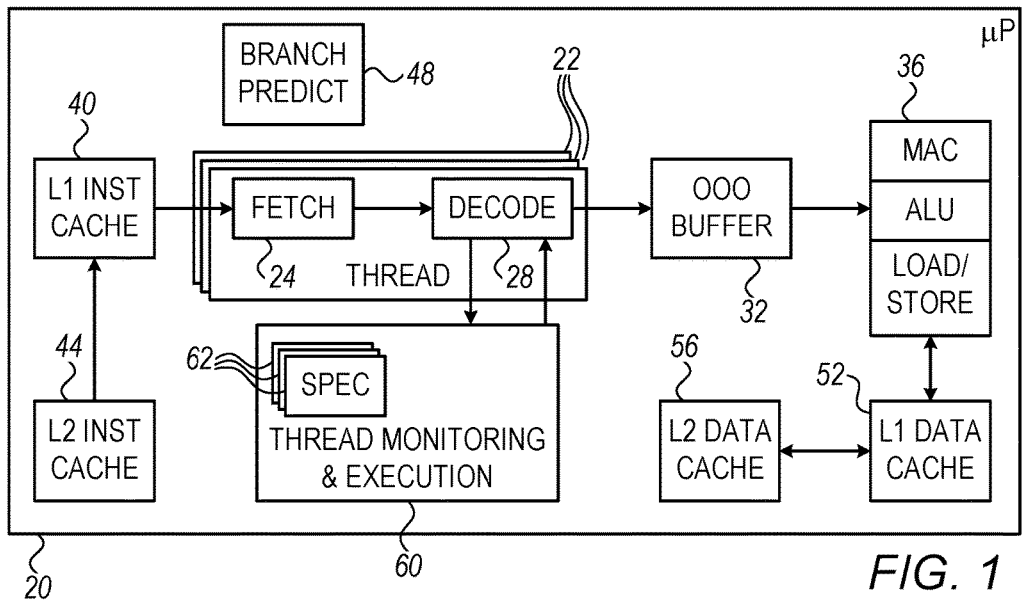
FIG. 2 is a diagram that schematically illustrates run-time parallelization of a program loop, in accordance with an embodiment of the present invention.

Embodiments of the present invention that are described herein provide improved methods and devices for run-time parallelization of code in a processor. In the disclosed embodiments, the processor identifies a repetitive sequence of instructions, and creates and executes multiple parallel code sequences referred to as segments, which carry out different occurrences of the sequence. The segments are scheduled for parallel execution by multiple hardware threads.

For example, the repetitive sequence may comprise a loop, in which case the segments comprise multiple loop iterations, parts of an iteration or the continuation of a loop. As another example, the repetitive sequence may comprise a function, in which case the segments comprise multiple function calls, parts of a function or function continuation. The parallelization is carried out at run-time, on pre-compiled code. The term "repetitive sequence" generally referred to any instruction sequence that is revisited and executed multiple times.

In some embodiments, upon identifying a repetitive sequence, the processor monitors the instructions in the sequence and constructs a "scoreboard"—a specification of access to registers by the monitored instructions. The scoreboard is associated with the specific flow-control trace traversed by the monitored sequence. The processor decides how and when to create and execute the multiple segments based on the information collected in the scoreboard and the trace.

In some embodiments, the scoreboard comprises a classification of the registers accessed by the monitored instructions. The classification of a register depends on the order in which the register is used as an operand or as a destination in the monitored instructions.

In some embodiments, micro-ops, although distinct from instructions, are monitored in a similar manner to monitoring of instructions, as well. In other words, in some embodiments, the monitoring is performed and the scoreboard is produced with micro-op granularity rather than instruction granularity.

The classification may distinguish, for example, between local (L) registers whose first occurrence is as a destination, global (G) registers that are used only as operands, and global-local (GL) registers whose first occurrence is as operands and are subsequently used as destinations. Additionally or alternatively, the scoreboard may indicate, for at least some of the registers, the location in the monitored sequence of the last write operation to the register. This indication may comprise, for example, a count of the number of write operations to the register.

In some embodiments, the processor continues to monitor the instructions in one or more of the segments during execution. Such continued monitoring enables the processor to react quickly and efficiently to changes in the flow-control trace that may occur in the monitored segments, e.g., as a result of data-dependent conditional branch instructions. Several examples of selection criteria, which the processor may use for selecting segments for continued monitoring, are described herein.

In some embodiments, the processor terminates and aborts monitoring of a certain segment before the segment ends. Various termination criteria that can be used by the processor are described herein. Additional disclosed techniques maintain multiple simultaneous scoreboards for multiple respective flow-control traces, and alternate between them as appropriate.

Processor Architecture

FIG. 1 is a block diagram that schematically illustrates a processor 20, in accordance with an embodiment of the present invention. Processor 20 runs pre-compiled software code, while parallelizing the code execution. Parallelization decisions are performed by the processor at run-time, by analyzing the program instructions as they are fetched from memory and decoded.

In the present example, processor 20 comprises an execution pipeline that comprises one or more fetching units 24, one or more decoding units 28, an Out-of-Order (OOO) buffer 32, and execution units 36. In the example of FIG. 1, the execution pipeline comprises multiple hardware threads 22, each comprising a respective fetching unit 24 and a respective decoding unit 28. Fetching units 24 fetch program instructions from a multi-level instruction cache memory, which in the present example comprises a Level-1 (L1) instruction cache 40 and a Level-2 (L2) instruction cache 44.

A branch prediction unit 48 predicts the flow-control traces (referred to herein as "traces" for brevity) that are expected to be traversed by the program during execution. The predictions are typically based on the addresses or Program-Counter (PC) values of previous instructions fetched by fetching units 24. Based on the predictions, branch prediction unit 48 instructs fetching units 24 which new instructions are to be fetched. The flow-control predictions of unit 48 also affect the parallelization of code execution, as will be explained below.

Instructions decoded by decoding units 28 are stored in OOO buffer 32, for out-of-order execution by execution units 36, i.e., not in the order in which they have been compiled and stored in memory. Alternatively, the buffered instructions may be executed in-order. The buffered instructions are then issued for execution by the various execution units 36. In the present example, execution units 36 comprise one or more Multiply-Accumulate (MAC) units, one or more Arithmetic Logic Units (ALU) and one or more Load/Store units. Additionally or alternatively, execution units 36 may comprise other suitable types of execution units, for example Floating-Point Units (FPU).

The results produced by execution units 36 are stored in a register file and/or a multi-level data cache memory, which in the present example comprises a Level-1 (L1) data cache 52 and a Level-2 (L2) data cache 56. In some embodiments, L2 data cache memory 56 and L2 instruction cache memory 44 are implemented as separate memory areas in the same physical memory, or simply share the same memory without fixed pre-allocation.

In some embodiments, processor 20 further comprises a thread monitoring and execution unit 60 that is responsible for run-time code parallelization. For this purpose, unit 60 constructs, maintains and applies multiple specifications 62, also referred to herein as "scoreboards," for different code segments. The functions of unit 60 are explained in detail below. Typically, unit 60 comprises hardware logic circuits, which are configured to carry out the monitoring and control functions that are described herein. Although unit 60 is shown in FIG. 1, for the sake of clarity, as a standalone logical block, the functions of unit 60 may in practice be distributed among the units of the execution pipeline, for example integrated with decoding unit 28. Alternatively or additionally, at least some of the functions of unit 60 may be executed in software or firmware, which runs on a suitable processing core within processor 20.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetch units 24 and multiple decoding units 28. Each hardware thread may comprise a fetch unit assigned to fetch instructions for the thread and a decoding unit assigned to decode the fetched instructions. Additionally or alternatively, multi-threading may be implemented in many other ways, such as using multiple OOO buffers, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements such as reorder buffer (ROB), register renaming, to name just a few. Further alternatively, the disclosed techniques can be carried out with processors having any other suitable microarchitecture.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Run-Time Code Parallelization

In some embodiments, unit 60 in processor 20 identifies repetitive instruction sequences and parallelizes their execution. Repetitive instruction sequences may comprise, for example, respective iterations of a program loop, respective occurrences of a function or procedure, or any other suitable sequence of instructions that is revisited and executed multiple times. In the present context, the term "repetitive instruction sequence" refers to an instruction sequence whose flow-control trace (e.g., sequence of PC values) has been executed in the past at least once. Data values (e.g., register values) may differ from one execution to another.

In the disclosed embodiments, processor 20 parallelizes a repetitive instruction sequence by invoking and executing multiple code segments in parallel or semi-parallel using multiple hardware threads. Each thread executes a respective code segment, e.g., a respective iteration of a loop, multiple (not necessarily successive) loop iterations, part of a loop iteration, continuation of a loop, a function or part or continuation thereof, or any other suitable type of segment.

Parallelization of segments in processor 20 is performed using multiple hardware threads. In the example of FIG. 1, although not necessarily, each thread comprises a respective fetch unit 24 and a respective decoding unit 28 that have been assigned by unit 60 to perform one or more segments.

In practice, data dependencies exist between segments. For example, a calculation performed in a certain loop iteration may depend on the result of a calculation performed in a previous iteration. The ability to parallelize segments depends to a large extent on such data dependencies.

FIG. 2 is a diagram that demonstrates run-time parallelization of a program loop, in accordance with an example embodiment of the present invention. The top of the figure shows an example program loop (reproduced from the bzip benchmark of the SPECint test suite) and the dependencies between instructions. Some dependencies are between instructions in the same loop iteration, while others are between an instruction in a given loop iteration and an instruction in a previous iteration.

The bottom of the figure shows how unit 60 parallelizes this loop using four threads TH1 ... TH4, in accordance with an embodiment of the present invention. The table spans a total of eleven cycles, and lists which instructions of which threads are executed during each cycle. Each instruction is represented by its iteration number and the instruction number within the iteration. For example, "14" stands for the 4$^{th}$ instruction of the 1$^{st}$ loop iteration. In this example instructions 5 and 7 are neglected and perfect branch prediction is assumed.

The staggering in execution of the threads is due to data dependencies. For example, thread TH2 cannot execute instructions 21 and 22 (the first two instructions in the second loop iteration) until cycle 1, because instruction 21 (the first instruction in the second iteration) depends on instruction 13 (the third instruction of the first iteration). Similar dependencies exist across the table. Overall, this parallelization scheme is able to execute two loop iterations in six cycles, or one iteration every three cycles.

It is important to note that the parallelization shown in FIG. 2 considers only data dependencies between instructions, and does not consider other constraints such as availability of execution units. Therefore, the cycles in FIG. 2 do not necessarily translate directly into respective clock cycles. For example, instructions that are listed in FIG. 2 as executed in a given cycle may actually be executed in more than one clock cycle, because they compete for the same execution units 36.

Parallelization Based on Segment Monitoring

In some embodiments, unit 60 decides how to parallelize the code by monitoring the instructions in the processor pipeline. In response to identifying a repetitive instruction sequence, unit 60 starts monitoring the sequence as it is fetched, decoded and executed by the processor.

In some implementations, the functionality of unit 60 may be distributed among the multiple hardware threads, such that a given thread can be viewed as monitoring its instructions during execution. Nevertheless, for the sake of clarity, the description that follows assumes that monitoring functions are carried out by unit 60.

As part of the monitoring process, unit 60 generates the flow-control trace traversed by the monitored instructions, and a monitoring table that is referred to herein as a scoreboard. The scoreboard comprises a respective entry for each register that appears in the monitored sequence. In an embodiment, unit 60 classifies each register as Global (G), Local (L) or Global-Local (GL), and indicates the classification in the corresponding entry in the scoreboard. The classification of a register as G, L or GL depends on the order in which the register is used as an operand (whose value is read) and/or as a destination (to which a value is written) in the monitored sequence.

In an embodiment, a local (L) register is defined as a register whose first occurrence in the monitored sequence is as a destination (subsequent occurrences, if any, may be as operand and/or destination). A Global (G) register is defined as a register that is used in the monitored sequence only as an operand, i.e., the register is read but never written to. A global-local (GL) register is defined as a register whose first occurrence in the monitored sequence is as an operand, and is later used in the monitored sequence as a destination. The first and subsequent occurrences may occur in different instructions or in the same instruction, as long as the order between "first" and "subsequent" is preserved.

In an alternative embodiment, an exception to the above classification concerns a conditional instruction that uses a register as a destination. If such an instruction is the first occurrence of the register in the monitored instructions, then the register is classified as GL. Otherwise, the register is classified as local (L) as per the above rules. For example, register r2 in the instruction "mov_cond r2, #5" would be classified as GL if this instruction is the first write to r2 in the monitored instructions, and classified as L otherwise. In an alternative embodiment, if such an instruction is the first occurrence of the register in the monitored instructions, then the register is classified as GL. Otherwise, the register is classified as local only if the condition of the instruction is met. If not, the register is not classified.

In an embodiment, unit 60 uses superset classification, i.e., merges together two or more of the classes defined above. In such an embodiment, even if a given register is only local in a given segment, unit 60 still classifies it as GL for simplifying control.

An alternative way of defining the classification of registers as G, L or GL is classifying a register depending on where the dependencies of the register are generated and used relative to the currently-monitored segment: An operand that is generated outside the currently-monitored segment is classified as Global (G) or Global-Local (GL). An operand that is generated inside the currently-monitored segment is classified as Local (L).

In some embodiments, unit 60 finds and indicates in the scoreboard, for at least some of the registers, the location of the last write to the register in the monitored sequence. This indication is used by unit 60 during execution for deciding when to issue instructions in subsequent segments that depend on this last write. The rationale behind this mechanism is that an instruction in segment X that depends on the value of a register in a previous segment Y can be issued only after the last write to that register in the execution of segment Y.

In one embodiment, the last-write indication is implemented by counting the number of times that the register was written to in the monitored sequence. Unit 60 determines this count (denoted #WRITES) and indicates the #WRITES value in the entry of the register in the scoreboard.

In this embodiment, when executing segment Y, unit 60 counts the number of writes to the register in question. When the count reaches the #WRITES value indicated in the scoreboard, unit 60 concludes that the last write was encountered, and it is therefore permitted to issue for execution instructions in segment X which depend on the register in question.

One known solution for mitigating data dependencies is to rename registers, i.e., assign a given register different names in different segments. In some embodiments, unit 60 refrains from renaming registers, i.e., retains the register names across the different iterations of the repetitive sequence, in order to facilitate counting of #WRITES. In other words, unit 60 maintains alignment of the register renaming map between segments and threads.

The #WRITES mechanism described above is depicted only as an example of a mechanism for finding and indicating the location of the last write to a register in the monitored sequence. In alternative embodiments, unit 60 may find and indicate in the scoreboard the location of the last write to a register in any other suitable way, for example by recoding in the scoreboard the address of the last write operation to the register.

In various embodiments, unit 60 does not necessarily need to count #WRITES for every register. For example, unit 60 may count #WRITES for the registers classified as GL, for the registers classified as L, or both.

In some embodiments, unit 60 includes in the count of #WRITES conditional write instructions, regardless of whether the condition is met or not. In other embodiments, unit 60 includes a conditional write instruction in the count of #WRITES only when the condition is met and the write is actually performed.

In some embodiments, processor 20 maintains one or more flags that are used in conditional instructions. Examples of flags include a zero flag ("true" if the result of the most recent arithmetic operation was zero, "false" otherwise), a negative flag ("true" if the result of the most recent arithmetic operation was negative, "false" otherwise), a carry flag ("true" if the most recent addition operation produced a carry, "false" otherwise), an overflow flag ("true" if the most recent addition operation caused an overflow, "false" otherwise), or any other suitable flag. Typically, the flags are implemented as respective bits in a dedicated flags register. The flags are updated by various instructions or micro-ops.

In some embodiments, unit 60 monitors the flags and includes them in the scoreboard in a similar manner to monitoring of registers. For example, unit 60 may classify the flags as G, L or GL as explained above. Additionally or alternatively, unit 60 may count and record the position of the last write to each flag in the monitored sequence (e.g., by counting and recording #WRITES for the flags).

In some embodiments, unit 60 does not always necessarily monitor an entire segment from start to end. In an example embodiment, unit 60 may monitor (e.g., count writes and/or classify registers) from a certain middle point in a segment, and updates an existing scoreboard.

Continuous Monitoring of Multiple Traces

In some embodiments, unit 60 continues to monitor the instructions in one or more of the threads during their execution. In other words, the monitoring process does not end once the repetitive instruction sequence has been identified and monitored. Unit 60 continues the monitoring and scoreboard construction process, for at least some of the threads, during execution. As noted above, the functionality of unit 60 may be distributed among the threads, such that each thread (or at least a subset of the threads) monitors the instructions it executes.

Continuous monitoring of segments during execution is important, for example, for efficient handling of scenarios in which the program execution switches from one flow-control trace to another at run-time. In many practical scenarios, the program alternates between two or more repetitive instruction sequences having different traces. In some embodiments, unit 60 handles such scenarios by creating and maintaining multiple different scoreboards in parallel, a respective scoreboard for each trace.

Figure 3:
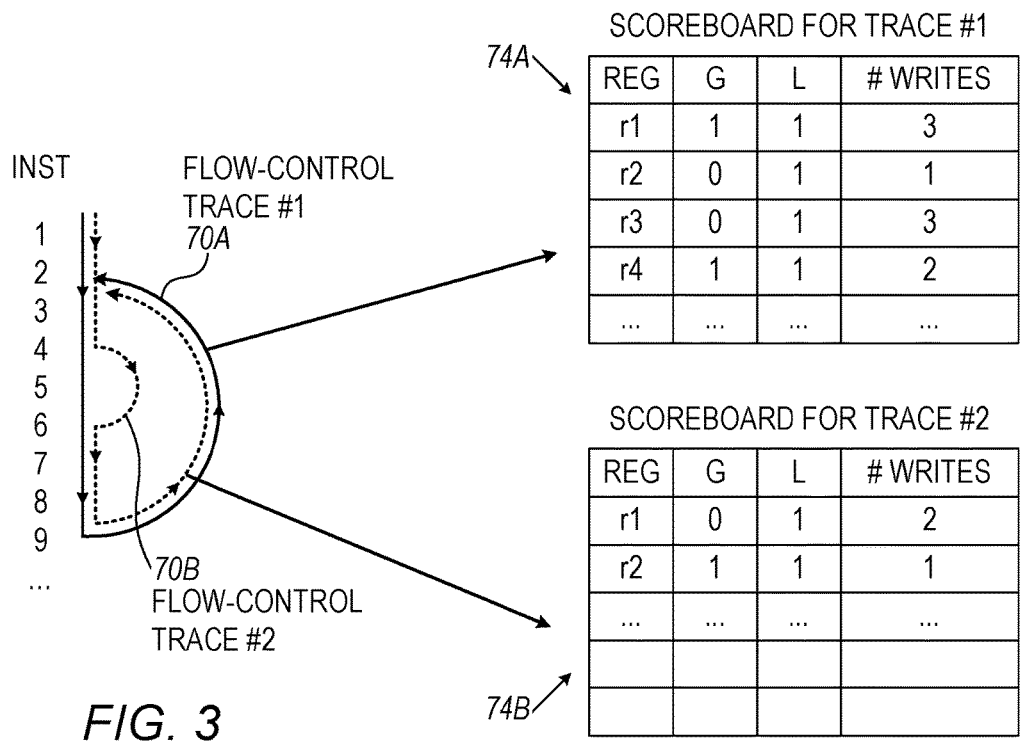
FIG. 3 is a diagram that schematically illustrates a program loop having multiple traces and respective scoreboards, in accordance with an embodiment of the present invention.

FIG. 3 is a diagram that schematically illustrates a program loop having multiple traces and respective scoreboards, in accordance with an embodiment of the present invention. The left-hand-side of the figure illustrates a section of code having nine instructions. A program loop starts at instruction 2 and loops back at instruction 9.

In this example, instruction 4 is a conditional branch instruction that jumps to instruction 6 and skips instruction 5. Thus, depending on the outcome of the conditional branch instruction, some segments will follow a trace denoted 70A (branch not taken) and other threads will follow a trace denoted 70B (branch taken).

In some embodiments, unit 60 monitors at least some of the segments during their execution. When detecting that a monitored segment begins to follow a previously-unknown trace, unit 60 creates a separate scoreboard for the new trace and records register classification and #WRITES as explained above. In the present example, unit 60 creates and maintains a scoreboard 74A for trace 70A, and a scoreboard 74B for trace 70B.

By maintaining multiple scoreboards, unit 60 is able to react quickly to trace changes. As long as a segment follows a previously-monitored trace, unit 60 already has a valid scoreboard for this trace. As a result, unit 60 is able to invoke new segments immediately using the available scoreboard. Without this mechanism, invocation of new segments would be delayed until the scoreboard for the new trace is constructed (meaning that efficiency is degraded and that the processor assumes, perhaps erroneously, that the trace it is monitoring is new).

The multiple-trace scenario of FIG. 3 is a simple example scenario that is depicted in order to demonstrate the mechanisms of continuous monitoring and multiple scoreboards. The disclosed technique can be used in any other suitable type of scenario in which execution alternates between multiple flow-control traces.

Figure 4:
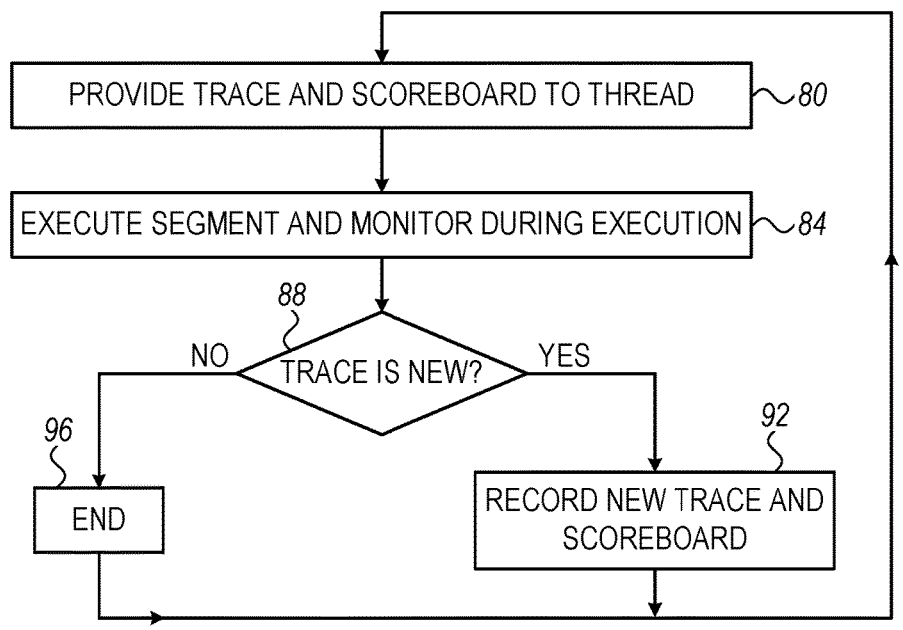
FIG. 4 is a flow chart that schematically illustrates a method for continuous monitoring of repetitive instruction sequences, in accordance with an embodiment of the present invention.

FIG. 4 is a flow chart that schematically illustrates a method for continuous monitoring of repetitive instruction sequences, in accordance with an embodiment of the present invention. The figure illustrates combined execution and monitoring in a given thread. Unit 60 typically performs this process for any sequence that is selected for monitoring, not necessarily for every segment being executed.

The method begins with unit 60 providing a given trace and a corresponding scoreboard to a given hardware thread, at an initiation step 80. The thread in question executes the segment and in parallel performs monitoring, at an execution & monitoring step 84. As part of the monitoring process the thread generates a scoreboard for the trace it follows.

After completing execution of the segment, unit 60 checks whether the trace is new, at a checking step 88. In other words, unit 60 checks whether a scoreboard already exists for this trace. If the trace is new, unit 60 records the scoreboard constructed for this trace, at a recording step 92. This scoreboard will be provided to subsequent threads that follow the same trace. Otherwise, i.e., if a scoreboard already exists, the method ends at an end step 96.

In some embodiments, a scoreboard is uniquely associated with a single flow-control trace. In other embodiments, a given scoreboard may be associated with two or more traces.

In some embodiments unit 60 monitors every segment during execution, for example using the method of FIG. 4. In alternative embodiments, unit 60 may choose to monitor only a subset of the segments. By controlling the number and identities of the segments chosen for monitoring, it is possible to set different trade-offs between computational overhead and parallelization performance.

Unit 60 may use various criteria or logic for selecting which segments to monitor. For example, unit 60 may choose segments for monitoring periodically, e.g., every $N^{th}$ segment being invoked (for some selected constant N). In another embodiment, unit 60 may choose to monitor segments in accordance with a predefined deterministic pattern, e.g., segments 2, 3, 5, 12, 13, 15, 22, 23, 25, . . . . As another example, unit 60 may choose segments for monitoring at random, e.g., skip a random number of segments, choose a segment for monitoring, skip another random number of segments, choose a segment for monitoring, and so on.

As yet another example, unit 60 may choose a segment for monitoring in response to some predefined event that occurs during execution of the segment. Since different threads may follow different flow-control traces, unit 60 may choose to monitor segments that follow a particular trace of interest. Further alternatively, unit 60 may select segments for monitoring during execution using any other suitable criteria.

In an embodiment, monitoring by unit 60 is performed on the instructions at the output of decoding module 28. At this point in the pipeline, the instructions are still speculative, in the sense that some of the decoded instructions will be flushed and not committed. Flushing may occur, for example, due to branch mis-prediction. Nevertheless, it is preferable to monitor instructions at this early stage because the instructions are still organized in-order. Moreover, monitoring instructions early in the pipeline enables unit 60 to make use of the scoreboard (i.e., invoke parallel segments with the scoreboard) with lower latency.

Figure 5:
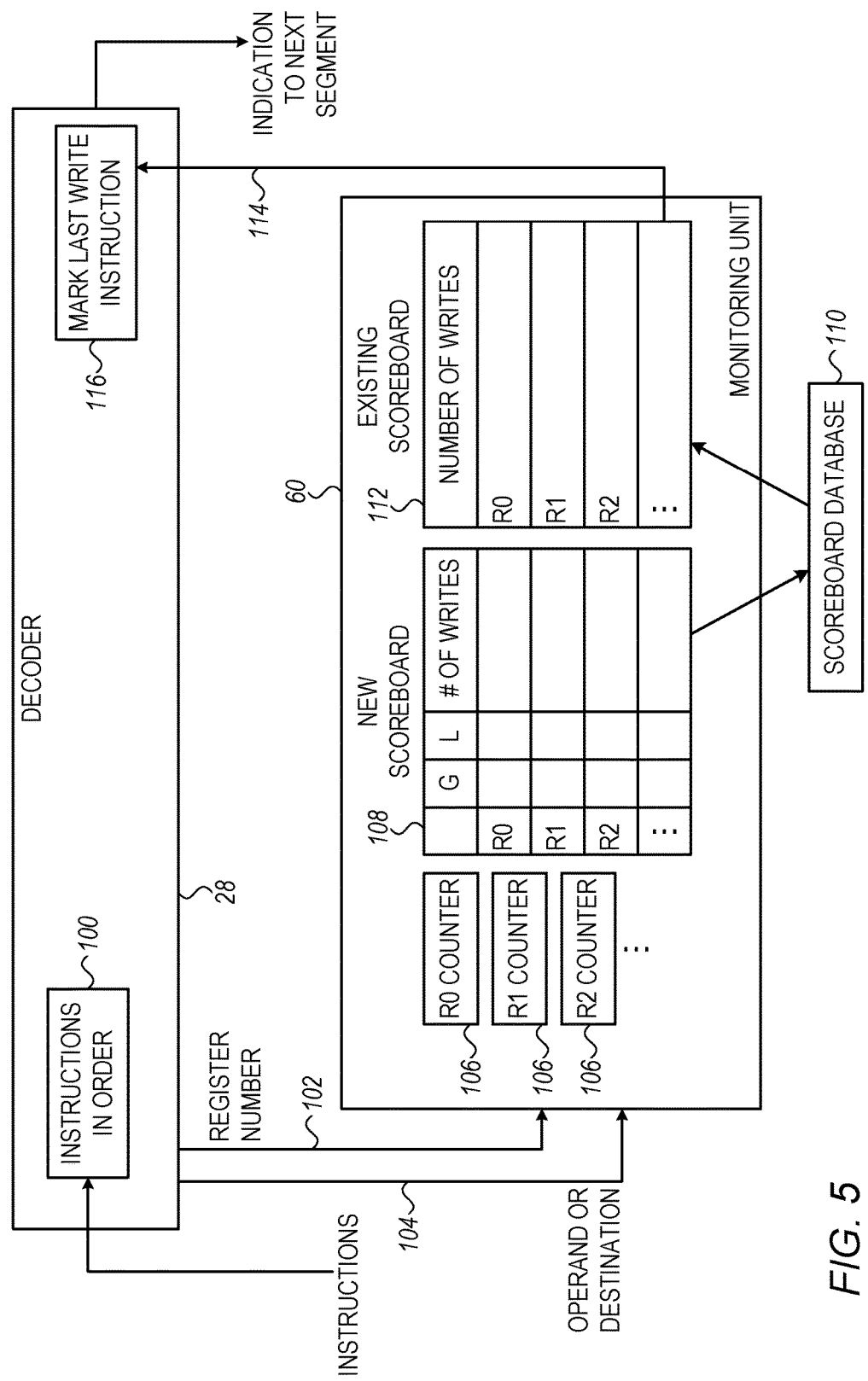
FIG. 5 is a block diagram showing details of a thread monitoring and execution unit, in accordance with an embodiment of the present invention.

FIG. 5 is a block diagram showing details of a thread monitoring and execution unit 60, in accordance with an embodiment of the present invention. Decoders 28 feed instructions 100 to unit 60 in the order in which the instructions arrive at the decoder. For each instruction, the information passed by the decoder to the monitoring unit includes register numbers 102 of each register that is accessed in executing the instruction and an indication 104 whether the register serves as an operand or a destination (or both) in the instruction. Unit 60 maintains a counter 106 for each register, which it increments per destination register based on register numbers 102.

When instructions 100 belong to a new sequence (without an existing scoreboard), unit 60 constructs a new scoreboard 108 for the current trace. As explained above, scoreboard 108 lists the registers accessed by thread 22, as reported by decoder 28, with the G and L flag values and a record of the number of writes performed in the trace to each register. When monitoring of a given segment ends successfully i.e., without meeting a termination criterion, unit 60 saves the result in a scoreboard database 110. The process of creating such a scoreboard is described further hereinbelow with reference to FIG. 6, while termination of monitoring of a segment before completion of the scoreboard is described hereinbelow with reference to FIG. 7.

On the other hand, when threads 22 are running code in parallel, and unit 60 encounters a repetitive segment for which an existing scoreboard 112 has already been stored in database 110, unit 60 retrieves the existing scoreboard. During execution of the segment, unit 60 compares the values of register counters 106 to the number of writes to each register that is listed in scoreboard 112. Once the count for a given register reaches the number in the scoreboard, unit 60 asserts a signal 114 to decoder 28 to mark an instruction 116 containing the last write to this register. On the basis of this marking, decoder 28 is able to indicate to the next thread 22 (FIG. 1) that the value in this register is updated and can now be accessed. Thus, unit 60 enables threads 22 to parallelize the execution of segments of the code with minimal delay between start times of successive segments while ensuring that all registers contain the correct values. Further details of logical mechanisms that can be used in this sort of parallelization are described, for example, in U.S. patent application Ser. No. 14/924,833, filed Oct. 28, 2015, whose disclosure is incorporated herein by reference.

Figure 6:
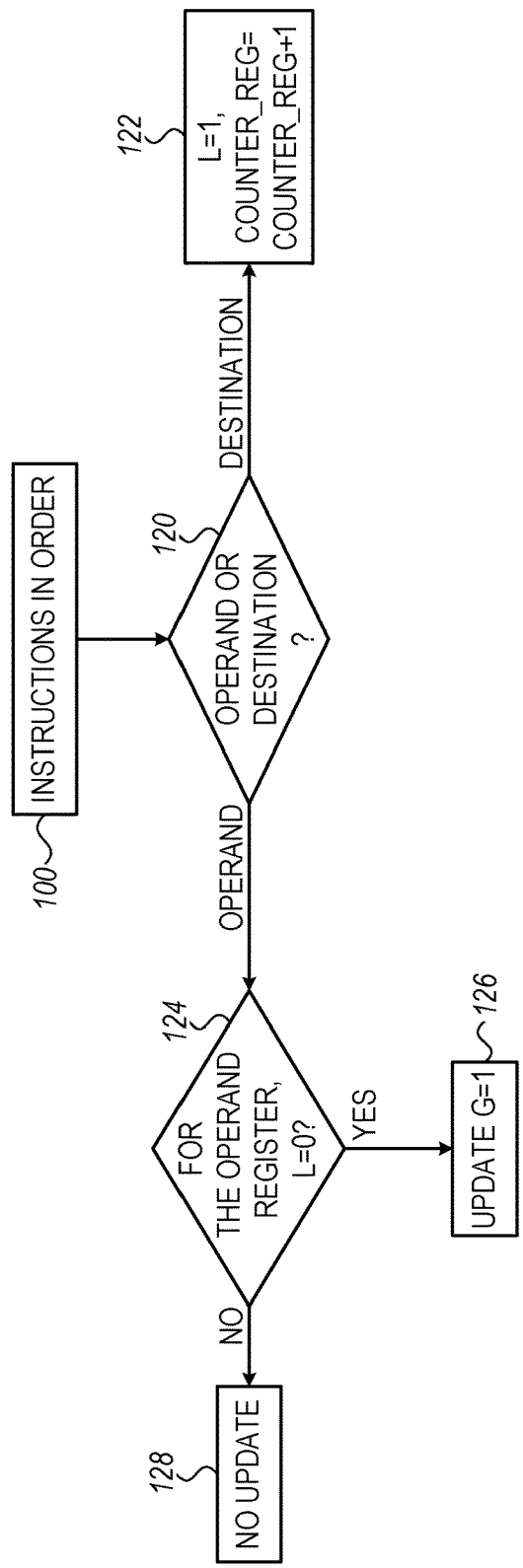
FIG. 6 is a flow chart that schematically illustrates a method for monitoring of register access, in accordance with an embodiment of the present invention.

FIG. 6 is a flow chart that schematically illustrates a method applied by unit 60 in monitoring of register access for purposes of constructing scoreboards 108, in accordance with an embodiment of the present invention. As unit 60 receives each instruction 100 in order from decoder 28, it checks register number 102 and indication 104 as to whether the register is an operand or destination in the present instruction, at a register checking step 120. If the register is the destination of the current instruction, unit 60 sets the flag L=1 and increments the write counter, at a write update step 122.

On the other hand, if the register is an operand in the instruction, unit 60 first checks the value of L for the register in question, at a flag checking step 124. If L=0 (meaning that the register has not served as a destination in the current trace), unit 60 sets G=1, at a read update step 126. Otherwise, unit 60 makes no update to scoreboard 108, at a completion step 128.

Operation of the unit then proceeds to the next instruction 100, until monitoring has been completed or aborted, as described in the next section.

Monitoring Termination Criteria

In general, unit 60 continues to monitor the instructions in a given segment until the processing pipeline completes an iteration through the segment. For example, in monitoring an iteration through a loop, unit will end the monitoring and save the corresponding scoreboard in database 110 when the instructions branch back to the beginning of the segment.

In some embodiments, however, unit 60 terminates monitoring of a given segment before the end of the segment. Various termination criteria can be evaluated and used by unit 60 for this purpose. In general, the purpose of such termination is to cut off monitoring and scoreboard construction at a point at which the costs of monitoring, in terms of processing and memory resources, outweigh the potential benefit that may be realized by parallelizing execution of the segment in question. Termination of monitoring at such a point enables unit 60 to free its resources to monitor other segments that are better candidates for parallelization of execution.

Figure 7:
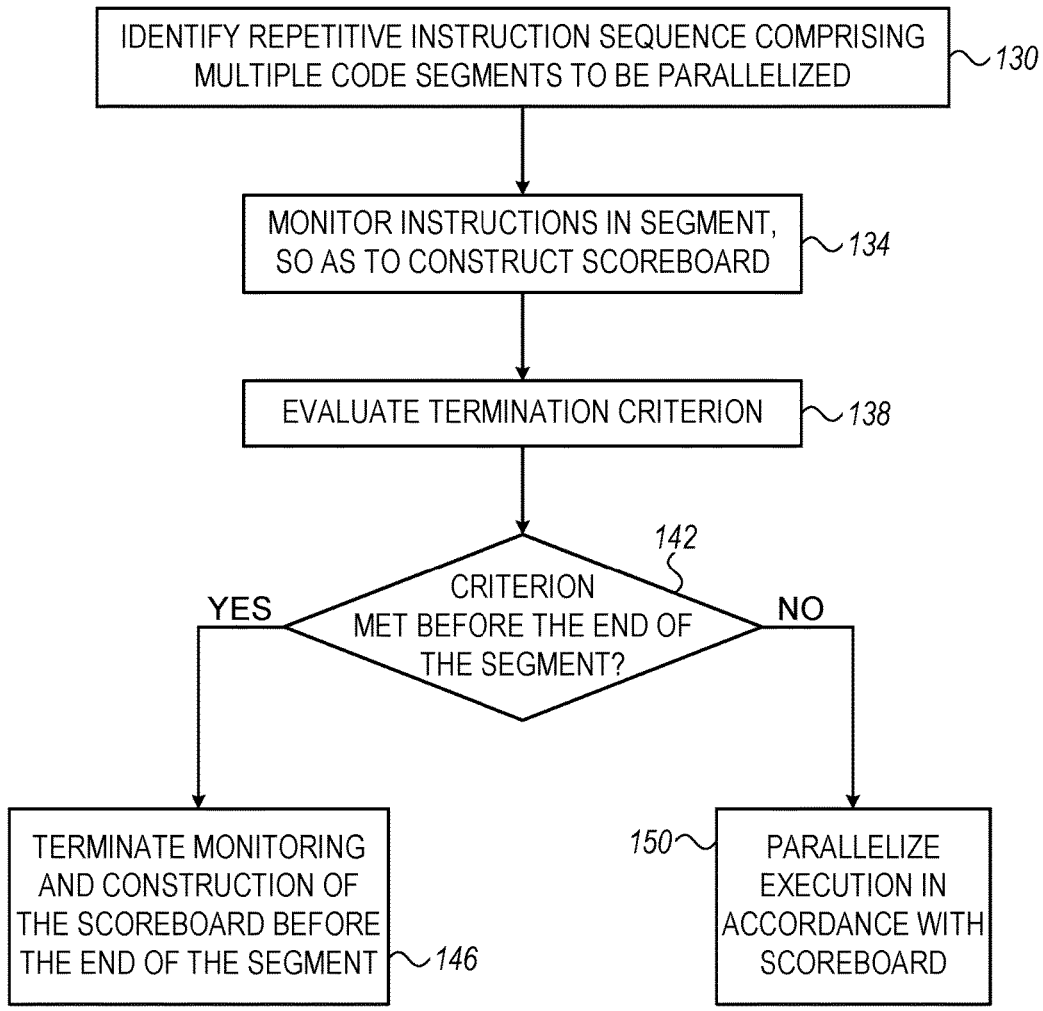
FIG. 7 is a flow chart that schematically illustrates a method for early termination of monitoring of repetitive instruction sequences, in accordance with an embodiment of the present invention.

FIG. 7 is a flow chart that schematically illustrates a method for early termination of monitoring of repetitive instruction sequences, in accordance with an embodiment of the present invention. The method begins with unit 60 identifying a repetitive instruction sequence, at a sequence identification step 130. At a monitoring step 134, unit 60 monitors the instructions in a given segment so as to construct the scoreboard, as described above. At a termination evaluation step 138, unit 60 evaluates a termination criterion in order to decide whether to continue monitoring the current segment.

Several non-limiting examples of termination criteria that can be evaluated and implemented at step 142 comprise:

The number of writes to a register exceeds a threshold.
The number of registers that were written to exceeds a threshold.
The count of instructions or micro-ops exceeds a threshold.
The count of execution cycles exceeds a threshold.
The number of branch instructions exceeds a threshold.
The monitoring reached a location in the program code that was monitored previously.

The monitoring reaches a location in the program code that is identified as repetitive (e.g., a backward branch or branch link—BL).

A branch mis-prediction occurs in one of the instructions in the monitoring or in the instructions preceding the monitoring.

The flags are GL or global.

Further alternatively, any other suitable termination criteria can be used.

At a termination checking step 142, unit 60 checks whether the termination criterion is met before the end of the given segment. If so, unit 60 terminates the monitoring of the given segment, and thus terminates construction of the scoreboard, before the end of the segment, at a termination step 146. Otherwise, unit 60 parallelizes execution of the segments in accordance with the scoreboard, at a parallelization step 150.

The following example will illustrate how a typical scoreboard is constructed by unit 60 and how this construction is terminated upon occurrence of a termination criterion—in this case, when a threshold number of branch instructions, for example, six branch instructions, is exceeded. Assume unit 60 to be monitoring the following code:

1: mov r3, r2
2: ldr r0, [r2]
3: add r5, r5, #1
4: cmp r5, #38
5: beq 25
6: add r0, r0, #2
7: b 1

As long as the branch in line 5 is not taken (i.e., there is no jump to line 25), unit 60 will create the scoreboard shown in Table I below for the segment between lines 1 and 7. Note that the instruction in line 3 makes R5 become G=1 and L=1, since R5 is both an operand and a destination register (and the operand comes first). Further note that the instruction in line 4 writes to a flag, which is also being monitored.

TABLE I

SAMPLE SCOREBOARD

| Register | G | L | Number of writes |
|---|---|---|---|
| r0 | 0 | 1 | 2 |
| r1 | 0 | 0 | 0 |
| r2 | 1 | 0 | 0 |
| r3 | 0 | 1 | 1 |
| r4 | 0 | 0 | 0 |
| r5 | 1 | 1 | 1 |
| ... | | | |
| flag | 0 | 1 | 1 |

Unit 60 will save the above table as a scoreboard for lines 1 to 7.

Suppose, on the other hand, that the code sequence causes the branch in line 5 to be taken, i.e., to jump to line 25. At this stage, monitoring unit 60 continues monitoring the sequence of instructions and waits for a branch backwards to line 1 in order to end the monitoring of this segment successfully and complete the scoreboard. Let us assume, however, that the code starting in line 25 runs as follow:

25: cmp r0, 17
26: beq 108
27: cmp r0, 18
28: beq 200
29: cmp r0, 27
30: beq 160
31: cmp r0, 57
32: beq 300

Monitoring unit 60 counts the number of branches it encounters in order to evaluate the applicable termination criterion. If all branches in the code are not taken, the processor will reach the sixth branch instruction in the segment at line 32. At this point, unit 60 will find at step 142 that the termination criterion has been met, and it will therefore proceed to abort monitoring at step 146 without completing construction of the scoreboard shown in Table I.

Although the embodiments described herein mainly address general purpose processors, the methods and systems described herein can also be used in other applications, such as in Graphics Processing Units (GPUs) or other dedicated processors.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for operating a processing pipeline that includes multiple hardware threads and is configured to execute software code instructions that are stored in a memory while reading and writing to multiple registers during execution of the instructions, the method comprising:

monitoring execution of the instructions by the processing pipeline and recording, while the processing pipeline executes sequences of the instructions, respective monitoring tables indicating the registers accessed by the processing pipeline in executing the instructions in the sequences;

parallelizing among the hardware threads of the processor, using the respective monitoring tables, execution of repetitions of at least first sequences of the instructions;

while monitoring the execution and recording the respective monitoring table, evaluating a termination criterion that is met when, in a sequence of the instructions being monitored, a count of instructions or micro-ops, a count of execution cycles or a number of branch instructions exceeds a predefined threshold; and upon meeting the termination criterion before completion of the recording of the respective monitoring tables for at least second sequences of the instructions, terminating monitoring of the execution and recording of the monitoring tables.

2. The method according to claim 1, wherein the termination criterion is further met when, in the sequence of the instructions being monitored, a number of registers that were written to exceeds a given threshold.

3. The method according to claim 1, wherein the termination criterion is further met when, in the sequence of the instructions being monitored, the monitoring reaches a location in the program code that was monitored previously.

4. The method according to claim 1, wherein the termination criterion is further met when, in the sequence of the instructions being monitored, the monitoring reaches a location in the program code that is identified as repetitive.

5. The method according to claim 1, wherein the termination criterion is further met when, in the sequence of the instructions being monitored, a branch mis-prediction occurs during or preceding the monitoring.

6. The method according to claim 1, wherein recording the monitoring tables comprises maintaining for each register written to by the processing pipeline in executing the instructions in a respective sequence, a record of the last instruction in the sequence at which the processing pipeline wrote to the register.

7. A processor, comprising:
   a processing pipeline comprising multiple hardware threads and configured to execute software code instructions that are stored in a memory;
   multiple registers, configured to be read and written to by the processing pipeline during execution of the instructions; and
   a monitoring unit, which is configured to monitor the instructions in the processing pipeline and to record respective monitoring tables indicating the registers accessed in processing the instructions in different sequences of the instructions, and to parallelize among the hardware threads of the processor, using the respective monitoring tables, execution of repetitions of at least first sequences of the instructions,
   wherein the monitoring unit is configured to evaluate, while monitoring the processing and recording the respective monitoring tables, a termination criterion that is met when, in a sequence of the instructions being monitored, a count of instructions or micro-ops, a count of execution cycles or a number of branch instructions exceeds a predefined threshold, and, upon meeting the termination criterion, to terminate the monitoring before completion of the recording of the respective monitoring tables for at least second sequences of the instructions, to terminate monitoring of the execution and recording of the monitoring tables.

8. The processor according to claim 7, wherein the termination criterion is further met when, in the sequence of the instructions being monitored, a number of registers that were written to exceeds a given threshold.

9. The processor according to claim 7, wherein the termination criterion is further met when, in the sequence of the instructions being monitored, the monitoring reaches a location in the program code that was monitored previously.

10. The processor according to claim 7, wherein the termination criterion is further met when, in the sequence of the instructions being monitored, the monitoring reaches a location in the program code that is identified as repetitive.

11. The processor according to claim 7, wherein the termination criterion is further met when, in the sequence of the instructions being monitored, a branch mis-prediction occurs during or preceding the monitoring.

12. The processor according to claim 7, wherein each of the monitoring tables is uniquely associated with a respective flow-control trace traversed by the monitored instructions.

13. The processor according to claim 7, wherein at least some of the monitoring tables are associated with two or more flow-control traces traversed by the monitored instructions.

14. The processor according to claim 7, wherein the monitoring unit is configured to monitor the instructions immediately following decoding of the instructions in the processing pipeline of the processor.

15. The processor according to claim 7, wherein the monitoring unit is configured to monitor the instructions before execution of the instructions in the processing pipeline of the processor, including monitoring speculative instructions that will be subsequently flushed.

16. The processor according to claim 7, wherein the monitoring unit is configured to retain respective names of the registers throughout the monitoring.

17. The processor according to claim 7, wherein each of the monitoring tables comprises, for each register written to by the processing pipeline in executing the instructions in a respective sequence, a record of the last instruction in the sequence at which the processing pipeline wrote to the register.

18. The processor according to claim 17, wherein the processing pipeline is configured to decide, during the parallelized execution of each of the repetitions, when to issue the instructions with regard to a given register in subsequent repetitions based on the record of the last instruction at which the processing pipeline wrote to the given register.

19. The processor according to claim 18, wherein the record of the last instruction comprises a count of a number of times that each register was written to by the processing pipeline in executing the instructions in the sequence, and wherein the monitoring unit is configured to determine, in each of the repetitions, that the last instruction has been written to the given register by counting writes in each of the repetitions up to the count in the record.

20. The processor according to claim 7, wherein the monitoring unit is configured to classify at least some of the registers in the monitoring tables as one of:
   a local register whose first occurrence in a given monitored sequence is as a destination;
   a global register that is used in the given monitored sequence only as an operand; and
   a global-local register whose first occurrence in the given monitored sequence is as an operand, and is subsequently used in the given monitored sequence as a destination.

* * * * *